Patented Aug. 18, 1925.

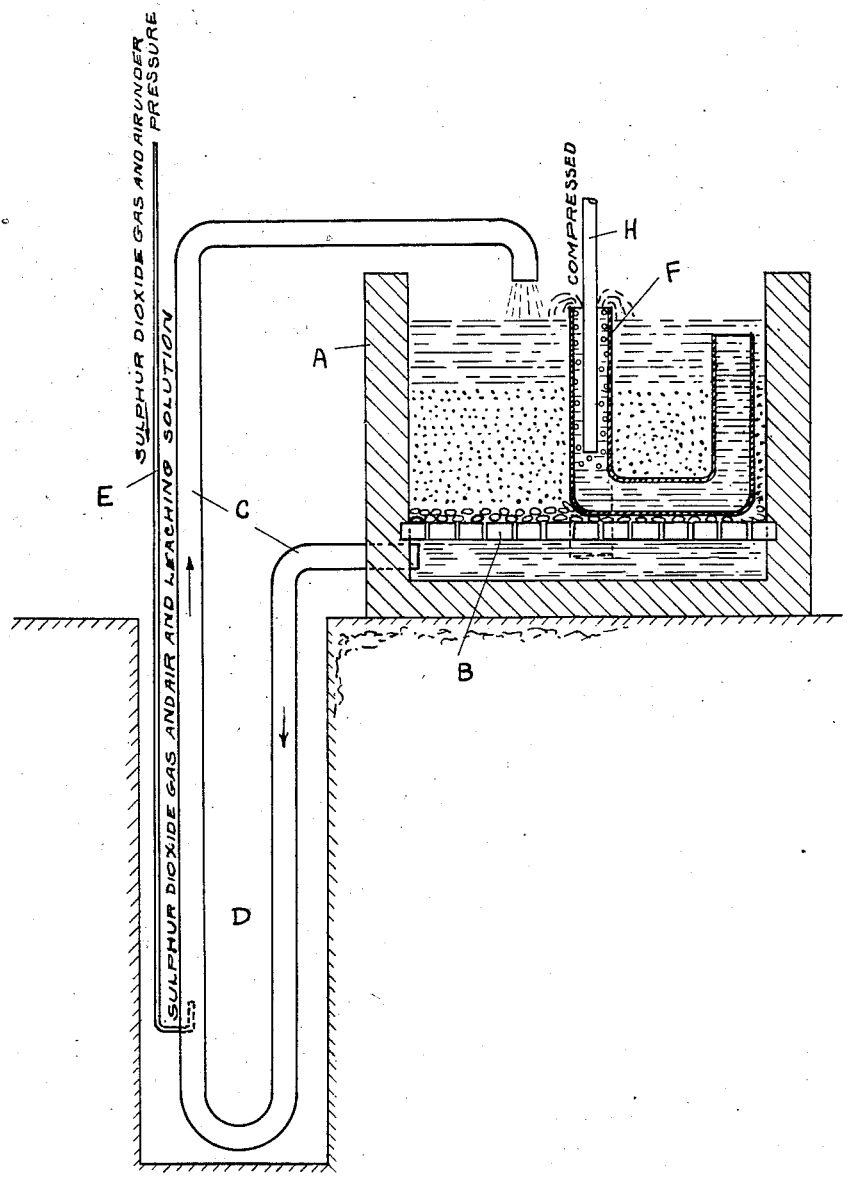

1,550,521

UNITED STATES PATENT OFFICE.

JOHN BERTRAM DU FAUR, OF TURRAMURRA, NEAR SYDNEY, NEW SOUTH WALES, AUSTRALIA, ASSIGNOR TO ALBERT JAMES McBRIDE AND PHILIP ALBERT McBRIDE, BOTH OF ADELAIDE, SOUTH AUSTRALIA, AUSTRALIA.

PROCESS AND APPARATUS FOR RECOVERING COPPER FROM ITS OXIDIZED OR ROASTED ORE.

Application filed September 28, 1923. Serial No. 665,395.

*To all whom it may concern:*

Be it known that I, JOHN BERTRAM DU FAUR, a subject of the King of Great Britain and Ireland, residing at Turramurra, near Sydney, State of New South Wales, Commonwealth of Australia, have invented a certain new and useful Process and Apparatus for Recovering Copper from Its Oxidized or Roasted Ore, of which the following is a specification.

This invention has been devised for the recovery of copper from its oxidized or roasted ore and especially from those in which it exists in the form of carbonate or silicate or both.

My improved process consists essentially in treating the ore whether in the form of sands or slimes with a leaching solution which contains sulphate of iron and which is continuously impregnated with a current of sulphur dioxide gas and air under pressure which is injected into the solution in such manner as to cause it to circulate through the ore. If the ore is in the form of sands it is placed in a vat having a false bottom and therein subjected to the action of a leaching solution containing sulphate of iron, such solution being caused to circulate through two pipe systems, in the one of which the solution is drawn from beneath the false bottom and discharged over the surface of the solution in the vat, the circulation of such solution being caused by means of a current of sulphur dioxide gas and air under pressure injected into the pipe system at a suitable point and functioning on the air lift principle, and in the other system solution is drawn from beneath its surface in the vat and discharged over its surface being caused to circulate by means of a current of air under pressure injected into the pipe at a suitable point and functioning on the air lift principle also. When the ore is in the form of slimes I use in place of the leaching vat any well known form of agitator vat sometimes known as an agitator.

A convenient form of apparatus for carrying out this process when the ore is in the form of sands is shown in the accompanying drawing, which is an elevation partly in section.

A is a leaching vat of any ordinary construction having a false bottom B preferably formed of loosely set bricks, or wood planks bored with a number of holes, and covered with suitable filtering material such as gravel or cocoanut matting as is generally used in leaching vats.

C is a U shaped pipe the one end of which passes through the wall of the vat A and opens into the space beneath the false bottom B. Its one leg (the inlet) is carried downward below the bottom of the vat in a pit or shaft D and then by means of a return bend its other leg (the outlet) is carried up and thence to and over the top of the vat as shown. To the rising leg of the pipe C, a short distance above the return bend, is connected a pipe E whereby a mixture of sulphur dioxide gas and air under pressure may be forced into the pipe C by means of a suitable blower (not shown) of ordinary construction.

F is a U shaped pipe one end (the inlet) of which is positioned below the surface of the solution in the vat A while its other end (the outlet) is positioned slightly above the surface of the solution. The outlet end however may be just level with the surface of the solution or even below it. Within the pipe F is a smaller pipe H whereby compressed air may be delivered to the pipe F a short distance above its lowest part by means of a suitable blower (not shown) of ordinary construction.

My process is carried out as follows—

The oxidized or roasted ore, which has been previously crushed to the desired degree of fineness, is placed in the vat A upon the false bottom B. It is then covered with the leaching solution containing sulphate of iron, which has been previously produced in any well known manner, but subsequently additional sulphate may be formed by absorption of soluble iron from the ore under treatment. The leaching solution passes through the ore and through the false bottom and fills the pipe C up to its own level in the vat.

A mixture under pressure of sulphur dioxide gas and air is then forced through the pipe E into the pipe C and the action of the gases on entering th pipe C is to cause a continuous circulation of the leaching solution through the ore bed, it being drawn from the leaching vat A (from below the false bottom B) and discharged over the surface of the ore, through which it again percolates to the pipe C. The sulphur dioxide is prepared preferably by burning sulphur or pyritic ores in an enclosed furnace through which the compressed air is forced by the blower, or it may be prepared by drawing the gases from any suitable furnace working at atmospheric pressure through any suitable form of compressor to gain the necessary pressure before use.

The rate of circulation for each batch of ore is governed according to (1) the porosity of the ore bed (2) the rate at which the ore bed is able to neutralize the leaching properties of the solutions.

By this means the copper in the ore is brought into solution and a high absorption of the sulphur dioxide by the solution is obtained throughout the leaching process.

The pipe system F H is for the purpose of aerating the solution. Compressed air is delivered by means of the pipe H to a suitable depth in the pipe F, the action of which is to cause a rapid circulation of the vat solution through the pipe F, the solution being drawn into the one end of the pipe and delivered over the surface again from its other end.

The circulation system through the pipes F and H when properly regulated ensures the conversion of the dissolved copper into sulphate of copper. It also makes it possible, in conjunction with the main leaching solution circulating system through the pipes C and E, by varying the relative rate of circulation through the two circulating systems, to vary the iron contents of the solution at will; that is, the iron contents of the solution may be completely precipitated and again redissolved at the will of the operator. The iron content in the ferric state of the leaching solution may also be varied by this means.

When the ore is in the form of slimes, in place of the leaching vat shown, I use an agitator vat of any well known type, preferably one equipped with an air lift pump, to cause the circulation and aeration of the solution, and to this I fit a circulating pipe system operated by sulphur dioxide and air under pressure, similar to that C E shown in the drawing, the inlet pipe opening to the lower part of the agitator and the outlet discharging over the surface of the solution in the vat. The slimes are treated as in the case of the sands by a leaching solution which contains sulphate of iron and which is continuously impregnated with a current of sulphur dioxide gas and air under pressure.

From time to time portions of the solution are withdrawn from the vat, and the dissolved copper is precipitated from the solution by means of metallic iron and iron is dissolved as sulphate of iron as in the well known cementation process. This sulphate of iron solution is the source of supply of the sulphate of iron necessary to the process, when insufficient soluble iron sulphate exists in the ore. Only a small amount of sulphate of iron in solution is necessary as it is not consumed in the process, its action being more or less catalytic. From ¼% to ½% is generally used but either more or less could be used.

If the leaching vat be too large for one circulating apparatus as above described, several may be fitted to it.

Care must be taken that as far as possible the several parts of the apparatus are made of material that will not be destroyed by the solutions passing through them.

What I claim is—

1. A process for the recovery of copper from oxidized or roasted ore consisting in treating the ore with a leaching solution which contains sulphate of iron and subjecting the leaching solution to the action of a mixture of sulphur dioxide gas and air.

2. A process for the recovery of copper from oxidized or roasted ore, consisting in treating the ore with a leaching solution containing sulphate of iron, and subjecting the leaching solution to the action of a mixture of sulphur dioxide gas and air under pressure, whereby the mixture will be circulated through the leaching solution and the latter impregnated therewith.

3. A process for the recovery of copper from oxidized or roasted ore, consisting in placing the ore in a vat, subjecting it to the action of a leaching solution containing sulphate of iron, causing a mixture of sulphur dioxide gas and air to circulate through the leaching solution, and in causing the circulation of the leaching solution in the vat.

4. A process for the recovery of copper from oxidized or roasted ore consisting in placing the ore in a vat above the bottom of the same, subjecting the ore to the action of a leaching solution containing sulphate of iron, withdrawing the leaching solution from the bottom of the vat and discharging it along with a mixture of sulphur dioxide gas and air onto the surface of the said solution, and subjecting the solution to a current of air under pressure whereby to cause a portion of the solution to be raised and delivered upon the surface thereof.

5. An apparatus for use in the recovery of copper from oxidized or roasted ore, comprising the combination with a leaching vat of any suitable well known type, of a circulating pipe system operating on the air lift principle and comprising a main U-shaped pipe and a smaller pipe connecting therewith and adapted to be connected with a blower, the main pipe opening into the vat at the point near its bottom and passing thence below the bottom of the vat and thence upward and over the top of the vat, and the smaller pipe being connected to the main pipe near the bottom of the upwardly rising leg of same, substantially as described and for the purpose set forth.

6. An apparatus for use in the recovery of copper from oxidized or roasted ores containing same, comprising the combination with a leaching vat of any suitable well known type, of two circulating pipe systems operating on the air lift principle; one pipe system comprising a main U-shaped pipe and a smaller pipe connecting therewith and adapted to be connected with a main pipe opening into the vat at a point near its bottom passing thence downward below the bottom of the vat thence upward and over the top of the vat, and the smaller pipe being connected to the main pipe near the bottom of the upwardly rising leg of same; the second pipe system comprising a main pipe and a smaller pipe adapted to be connected with a blower, the main pipe having its inlet end positioned below the surface of the solution in the vat and its outlet end positioned approximately level with the surface of the solution, and the smaller pipe being positioned within the larger pipe and adapted to deliver air thereto a short distance above its lowest part, substantially as described and for the purpose set forth.

7. An apparatus for recovery of copper from oxidized or roasted ores, comprising a vat having a perforated false bottom, a U-shaped pipe extending below the vat and having one leg opening into the vat below the false bottom and its other leg extending above and over the vat, a small gas and air pipe connected to the lower part of this leg extending over the vat, a U-shaped pipe in the vat and having legs of unequal length, the longer leg being adapted to extend above the solution and the shorter one to be below the level of the solution of the tank, and an air pipe extending into the longer leg of said pipe.

In testimony that I claim the foregoing as my invention I have signed my name this 7th day of August, 1923.

JOHN BERTRAM DU FAUR.